Nov. 27, 1945.  W. E. MITTON  2,389,630
WORK TABLE FOR HANDLING EGGS
Filed Nov. 21, 1941  3 Sheets-Sheet 1

Inventor
W. E. Mitton
Attorney

Nov. 27, 1945.　　　W. E. MITTON　　　2,389,630
WORK TABLE FOR HANDLING EGGS
Filed Nov. 21, 1941　　　3 Sheets-Sheet 2
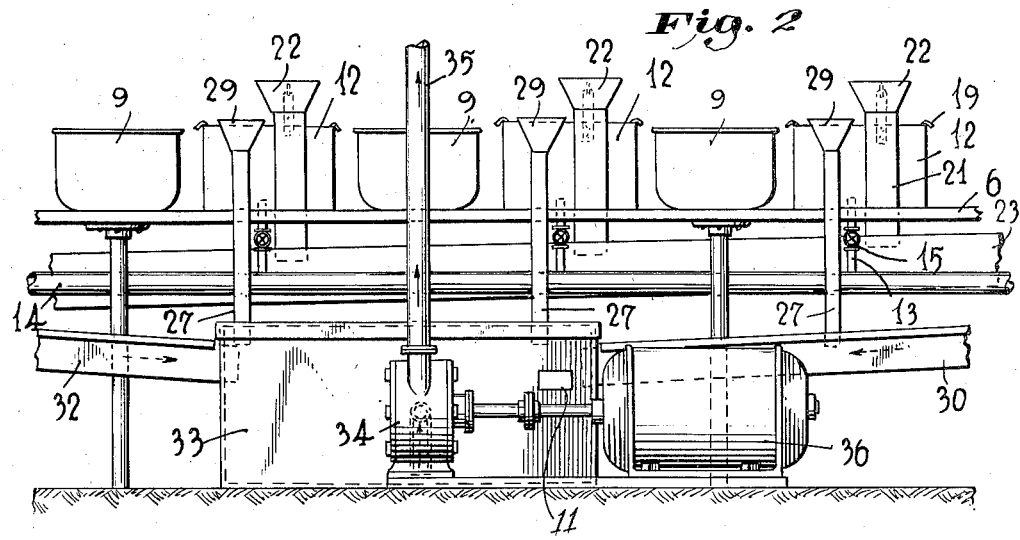
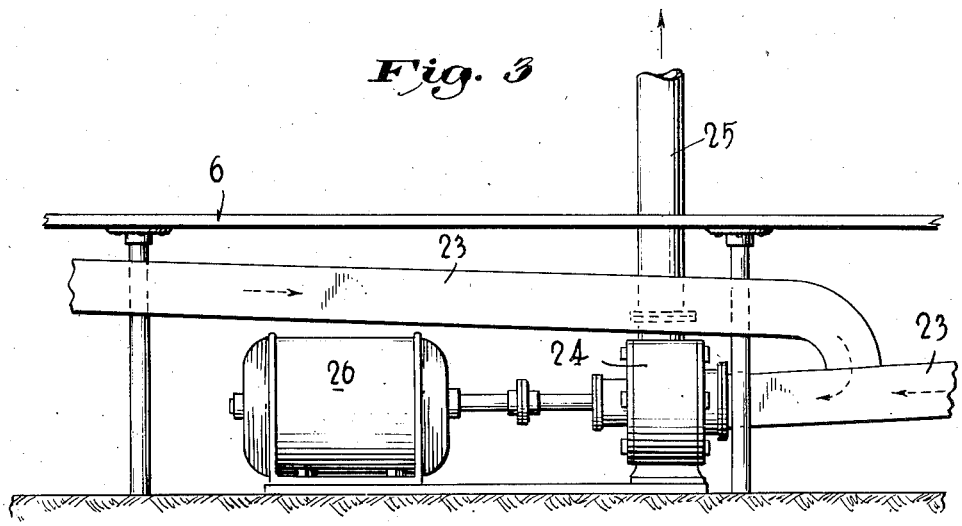
Inventor
William E. Mitton
By Elmer Stuart
Attorney Nov. 27, 1945.　　　W. E. MITTON　　　2,389,630
WORK TABLE FOR HANDLING EGGS
Filed Nov. 21, 1941　　　3 Sheets-Sheet 3

Inventor
William E. Mitton
By Elmer Stewart
Attorney

Patented Nov. 27, 1945

2,389,630

UNITED STATES PATENT OFFICE 2,389,630

WORKTABLE FOR HANDLING EGGS

William E. Mitton, Shawano, Wis., assignor, by mesne assignments, to W. E. Mitton Company, Shawano, Wis., a limited partnership Application November 21, 1941, Serial No. 420,036

13 Claims. (Cl. 146—2)

The invention of which the following is a detailed specification relates to egg cracking mechanism. More specifically the invention is in a work table for handling eggs incident to the meats being removed from the shells, inspected and transported for ultimate preservation by desiccation or freezing. Present day requirements of commerce and food production require the preparation near the source of supply of the egg meats in large quantities and in a form convenient for preservation and shipping. Ordinarily, the eggs are received in large quantities, sometimes carload lots and handled in metal baskets. The eggs have not been graded, candled or otherwise inspected. It is necessary that they be opened, inspected, the unwholesome or offensive eggs disposed of with the shell refuse and the egg meats reduced to merchantable form either by desiccation or freezing.

These operations are normally carried out by manual labor. The problem which this invention seeks to solve is to facilitate the manual operation of breaking open the egg shells, inspecting the contents, disposing of the refuse in a sanitary and unobjectionable manner and delivering the good egg meats in a wholesome form free from taint. The invention seeks to avoid any likelihood of unwholesome or offensive refuse remaining at the work places. It also facilitates cleanliness on the part of the workers and insures that the product be advanced to the drying step in the quickest time and with the least exposure of the egg meats to air, deterioration or contamination.

One of the objects of my invention is to provide a work table having a series of individual work stations where the worker is constantly supplied with the eggs to be handled.

A further object of my invention is to provide facilities for the convenient opening of the individual eggs and the immediate disposal of the refuse egg shells.

Another object of my invention is to provide for the convenient inspection of each egg as opened and its prompt collection and delivery to the drying mechanism without contamination or undue exposure to the air.

A still further object of my invention is to remove tainted eggs in a sanitary and inoffensive manner. Incidental to this purpose is the provision of washing equipment by which the worker may immediately remove any taint from spoiled or offensive eggs and at the same time insure the prompt disposal of refuse.

Among the objects of my invention is to reduce loss of good eggs by spillage during handling and from contamination with bad or offensive eggs which may infrequently reach the operator. The good eggs are disposed of in a manner which preserves their freshness and wholesomeness.

In carrying out my invention there is a consequential reduction in the labor necessary for transporting material and equipment.

As illustrating the preferred form of my invention, I have shown it embodied in a work table and associated facilities illustrated in the accompanying drawings in which Fig. 1 is a plan view, partly schematic, showing the complete work table and associated facilities;

Fig. 2 is a side elevation at the collecting station;

Fig. 3 is a side elevation at the refuse disposal station;

Figure 1:
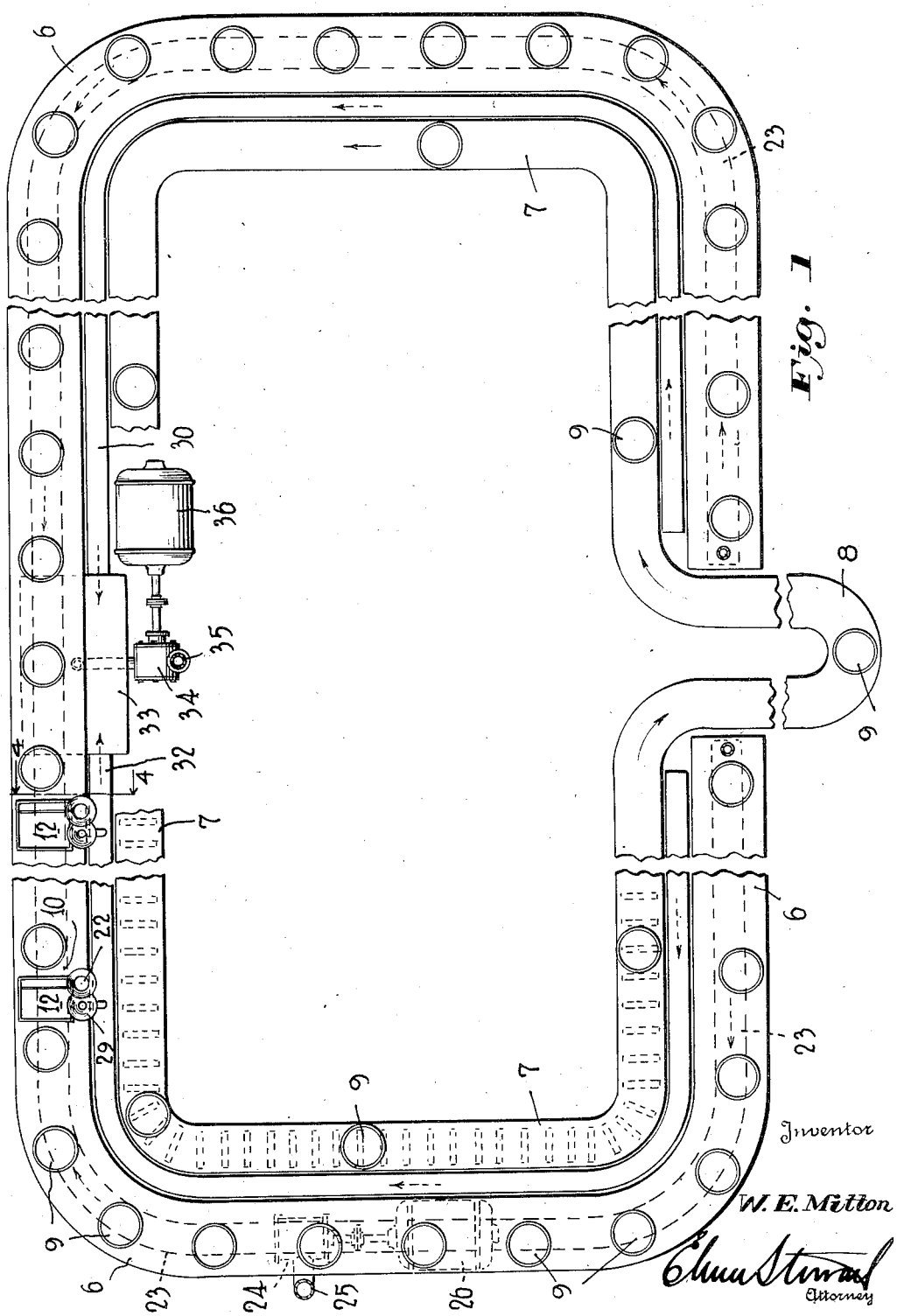

Generally speaking the purpose of the invention is carried out by providing a work table 6. This work table may be given any convenient form and extent dependent upon the area available and economy of handling material. In Fig. 1 it has been illustrated as a circuitous table forming a hollow rectangle.

Along one side of the table 6, I have provided an endless conveyer 7. This conveyer has a loading station 8 at one point where metal baskets 9 or other containers for eggs in the shell are received, being unloaded from a car or other vehicle. By means of the conveyer 7 these baskets are circulated along the inner side of the table 6. As each worker empties one basket it is returned to the conveyer and a full basket removed.

The table 6 is arranged with a plurality of work stations 10 of which two only are shown. At each work station the table provides a platform upon which the basket 9 is placed containing the eggs to be broken open.

At each station there is also provided a wash tank 12. This tank is relatively deep and is adapted to hold wash water which is delivered constantly through the inlet pipe 13. The flow of the water from the warm water manifold 14 through the pipe 13 is controlled by the valve 15.

Figure 5:
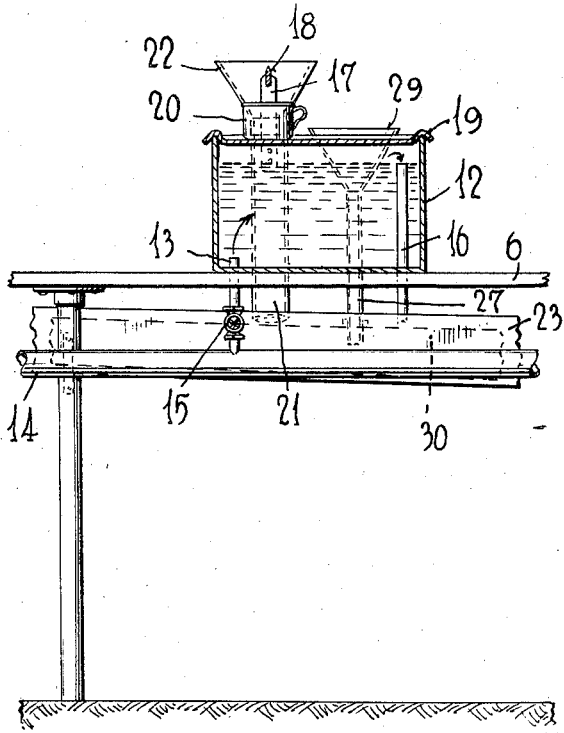
Fig. 5 is an elevation partly in cross section, taken on the line 5—5 of Fig. 4.

An overflow pipe 16 shown more particularly in Fig. 5, carries off the water from the rinsing tank. Thus the tank is continuously replenished and the water from the rinsing operation carried away through the overflow.

The top of the tank has standards 17, 17 on opposite sides which in turn support a removable rigid breaker blade or knife 18 having its sharp edge at the top as shown in Fig. 5.

A tray 19 of sheet metal or analogous material fits over the top of the tank 12 and forms a removable shelf during operation of the equipment. A cup 20 or other small receptacle rests upon the tray 19 beneath the knife 18. In the operation of breaking open the egg on the breaker knife 18, the egg meats fall into the cup 20 where they are individually inspected by the worker to determine whether there is any taint, or unwholesomeness in the egg. Each egg meat may thus be inspected and disposed of individually without contaminating the eggs subsequently opened.

On the outer side of the table 6 beyond the tank 12 there is a hole through which a vertical chute or pipe 21 projects. This has a funnel 22 at the top for receiving the broken egg shells and also the meat of a contaminated, tainted or unwholesome egg. The chute 21 delivers into the drain 23 supported longitudinally beneath the table 6.

In order to remove promptly all broken egg shells from the work stations the overflow 16 from all the tanks 12 deliver into the drain 23. Thus there is the constantly flowing stream in the drain 23 sufficient to float or otherwise carry off the broken egg shells and any residue of egg meat.

In the event that an egg is found to be tainted or unwholesome, it is also emptied from the cup 20 onto the funnel 22. Such an egg meat falls into the stream in the drain 23 and is immediately submerged so that it cannot give off an offensive or bad odor. The current of wash water rapidly flushes out any bad egg meats from the drain.

At some convenient point in the circuit of the work table the drain 23 delivers into a pump 24 (see Fig. 3). The drain 23 has its low extremities at the pump and slopes upwardly in both directions as shown in Fig. 3. In this way each branch of the drain serves a portion of the table and thus shortens the necessary travel of the refuse. From the pump 24 the current of wash water carrying the broken egg shells and other refuse is driven through the discharge pipe 25 by the motor 26 to any convenient place of disposal.

Figure 4:
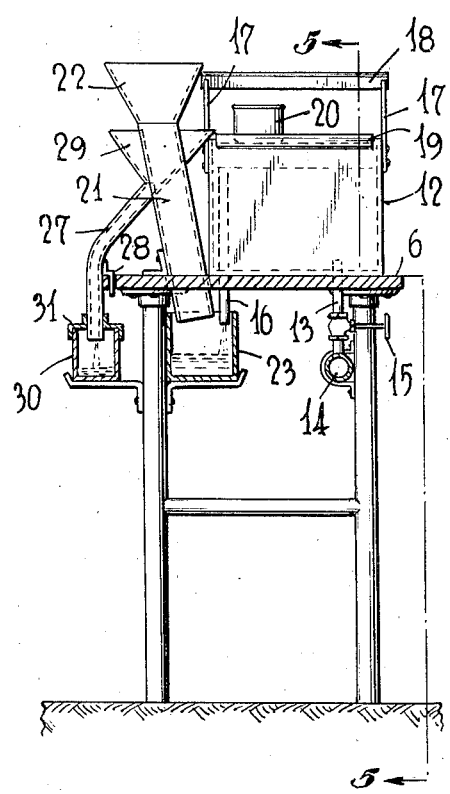
Fig. 4 is an elevation partly in cross section, taken on the line 4—4 of Fig. 1.

A second chute 27 is supported along one side edge of the table 6 for example by means of the hook 28 shown in Fig. 4. The upper part of the chute 27 has a funnel 29 above the general level of the tray 19.

The bottom of the chute 27 extends within a sluice, channel or the like 30 which is supported beneath the level of the table 6 and runs longitudinally thereof. This sluice has a removable cover 31 through which the end of the chute 27 extends. The funnel 29 receives the good egg meats from the cup 20 and delivers them to the covered sluice 30.

The sluice 30 extends throughout the length of the table 6 and has its low end 32 at an intermediate point projecting within a reservoir 33 (Fig. 2). In accordance with the arrangement of the table 6 there may be several sections of the sluice 30 all delivering into the reservoir 33. The discharge from the reservoir 33 is through a pump 34 and discharge pipe 35. The pump 34 is operated by means of a motor 36 which in turn is controlled by float control 11 in the reservoir 33.

The egg meats draining from the sluices 30 accumulate in the reservoir 33 until the level raises the float and actuates a switch in the circuit of the motor 36. The egg contents are then drawn out of the reservoir by the pump 34 and conveyed by the pipe 35 to the drying apparatus. The action of the pump is such as to thoroughly agitate and mix the egg meats so that the discharge from the pipe 35 is a well mixed fluid best adapted for drying purposes and a uniform product.

An operator is stationed opposite each work station and a basket ladened with eggs in the shell is placed on the platform of the work station, empty baskets being first removed to the conveyor. The operator takes the eggs from the basket and successfully breaks them over the breaking blade 18 into the cup 20. The egg shells are immediately dropped into the funnel 22. If the egg meat in the cup passes inspection it is then emptied in funnel 29. The funnel 29 and chute 27 discharge into the covered sluice where the egg meats from all stations drain by gravity into the reservoir 33.

If, however, as occasionally happens an egg is discovered on breaking to be unwholesome, tainted or offensive, it is emptied from the cup 20 into the funnel 22. From there it drops into the flowing current of wash water in the drain 23. There it is immediately submerged and thus prevented from becoming objectionable.

Practice requires that whenever an offensive egg is handled, the worker must then rinse the cup 20, the knife 18 and the tray 19 if any of the egg has been spilled on it. This is readily done by removing the tray 19 from its horizontal position over the tank and proceeding to wash the cup 20, the knife 18, the tray 19 and the worker's hands being cleaned and the cup and tray properly rinsed, the latter are then set up and the egg breaking operation continues.

The constant inflow of warm wash water to the tank 12 causes the continual discharge of the wash water through pipe 16 carrying away all vestige of the bad egg. It is this stream of wash water that maintains the satisfactory flow in drain 23 submerging the bad eggs and carrying off the egg shells. Additional cold water is added to sluice 23 at high end if necessary to maintain sufficient flow.

The assembly of facilities provided by the above described mechanism greatly facilitates the manual operation of breaking eggs and inspecting them. It also provides efficient means for collecting the egg meats for drying purposes. At the same time it avoids the normal accumulation of egg shells and disposes promptly and without offense of any spoiled eggs.

Provision of course is made at each work station for cleaning the equipment and the worker's hands whenever a spoiled egg is handled thus avoiding interruption of work or the necessity for the worker leaving the work station.

The arrangement of the table and the associated facilities is of course subject to variation to suit the particular premises. In like manner minor changes could be made in the general layout and in the details of the specific features of the work stations. The description and illustrations are merely illustrative and the invention is not limited beyond the scope of the appended claims.

What I claim is:

1. Means for handling eggs comprising a table having a series of individual work stations, means for transporting shell eggs in bulk to each station, a covered sluice extending longitudinally of the table, means for receiving and conveying egg meats from the sluice, a drain extending longitudinally of the table, a wash tank at each station, an overflow from each tank to the drain, a continuous supply of wash water for the tanks, a breaking blade held above the tank, a tray removably supported over the tank beneath the blade, and two chutes adjacent the table connecting respectively with the sluice and the drain.

2. Means for handling eggs comprising a table having a series of individual work stations, means for transporting shell eggs in bulk to each station, a covered sluice extending longitudinally of the table, means for receiving and conveying egg meats from the sluice, a drain extending longitudinally of the table, means for evacuating the drain, a wash tank at each station, an overflow from each tank to the drain, a continuous supply of wash water for the tanks, a breaking blade held above the tank, a tray removably supported over the tank beneath the blade, and two chutes adjacent the table connecting respectively with the sluice and the drain.

3. Means for handling eggs comprising a table having a series of individual work stations, a continuously operating conveyor for transporting shell eggs past each work station in succession, a sluice extending longitudinally of the table, means for receiving and conveying egg meats from the sluice, a drain extending longitudinally of the table, a wash tank at each station, an overflow from each tank to the drain, a continuous supply of wash water for the tanks, a breaking blade held above each tank, a movable tray on each tank and separate conducting means adjacent the tray connecting with the sluice and drain.

4. Means for handling eggs comprising a table having a series of individual work stations, means for transporting shell eggs in bulk to each station, a covered sluice extending longitudinally of the table, a reservoir fed by the sluice, a pump for evacuating the reservoir, a drain extending longitudinally of the table, a wash tank at each station, an overflow from each tank to the drain, a continuous supply of wash water for the tanks, a breaking blade held above each tank, a tray removably supported over each tank beneath the blade and two chutes adjacent the table connecting respectively with the sluice and the drain.

5. Means for handling eggs comprising a table having a series of individual work stations, means for transporting shell eggs in bulk to each station, a covered sluice extending longitudinally of the table, a reservoir fed by the sluice, a pump for evacuating the reservoir, means actuated by the filling of the reservoir for operating the pump, a drain extending longitudinally of the table, a wash tank at each station, an overflow from each tank to the drain, a continuous supply of wash water for the tank, a breaking blade held above each tank, a tray removably supported over each tank beneath the blade and two chutes adjacent the table connecting respectively with the sluice and the drain.

6. Means for handling eggs comprising an endless table having a series of individual work stations, an endless conveyer along the inner side of the table, a sluice supported by the table, a cover for the sluice, a reservoir fed by the sluice, a pump for evacuating the reservoir, means actuated by the filling of the reservoir for operating the pump, a drain supported by the table, a pump for evacuating the drain, a receiving platform on the table at each station, a wash tank adjacent each platform, an overflow outlet from the tank to the drain, a continuous supply of wash water for the tank, a horizontal breaking blade held above the tank, a tray removably supported over the tank beneath the blade, a chute adjacent the table connecting with the sluice and a chute adjacent the table connecting with the drain.

7. In combination, a table having a wash tank, means to supply water to the tank, an overflow pipe in the tank, a drain connected with the pipe, a chute adjacent the tank for delivery to the drain, a breaking blade held above the tank and a tray removably supported over the tank beneath the blade.

8. In combination, a table having a wash tank, means to supply water to the tank, an overflow pipe in the tank, a drain connected with the pipe, an egg breaking blade held above the tank, a tray removably supported over the tank beneath the blade, a sluice supported by the table, a chute for the sluice, and a funnel for the chute adjacent the tray.

9. In combination, a table having a wash tank, means to supply water to the tank, an overflow pipe in the tank, a drain connected with the pipe, an egg breaking blade held above the tank, a tray removably supported over the tank beneath the blade, a cup on the tray beneath the blade to receive the egg meat, a sluice supported by the table, a chute for the sluice and a funnel for the chute to receive the egg meat from the cup.

10. In combination, a table having a wash tank, means to supply water to the tank, means to receive the overflow from the tank, an egg breaking blade held above the tank, a tray removably supported over the tank beneath the blade, a cup on the tray beneath the blade to receive the egg meat, and a chute to receive the egg meats.

11. In combination, a table having a wash tank, means to supply water to the tank, means to receive the overflow from the tank, an egg breaking blade held above the tank, a tray removably supported over the tank beneath the blade, a cup on the tray beneath the blade to receive the egg meat, a chute to receive good egg meats and a second chute to receive bad egg meats.

12. In combination, a table having a wash tank, means to supply water to the tank, means to receive the overflow from the tank, an egg breaking blade held above the tank and a tray removably covering the tank beneath the blade.

13. In combination, a table having a platform, a wash tank adjacent the platform, means to supply water to the tank, means to receive the overflow from the tank, an egg breaking blade held above the tank, a tray removably covering the tank beneath the blade and means adjacent the tank for removing the egg meats.

WILLIAM E. MITTON.